C. METTLER, SR.

GRAIN CLEANER.

APPLICATION FILED AUG. 24, 1921.

Reissued Jan. 24, 1922.

15,275.

2 SHEETS—SHEET 1.

INVENTOR.
CHRISTOPH METTLER SR.
BY HIS ATTORNEY.
James F. Williamson

C. METTLER, SR.

GRAIN CLEANER.

APPLICATION FILED AUG. 24, 1921.

Reissued Jan. 24, 1922.

15,275.

2 SHEETS—SHEET 2.

INVENTOR
CHRISTOPH METTLER SR.
BY HIS ATTORNEY
James J. Williamson

UNITED STATES PATENT OFFICE.

CHRISTOPH METTLER, SR., OF MENNO, SOUTH DAKOTA, ASSIGNOR TO THE WONDER GRAIN CLEANER COMPANY, OF ST. PAUL, MINNESOTA, A CORPORATION OF SOUTH DAKOTA.

GRAIN CLEANER.

15,275. Specification of Reissued Letters Patent. Reissued Jan. 24, 1922.

Original No. 1,356,777, dated October 26, 1920, Serial No. 392,257, filed June 28, 1920. Application for reissue filed August 24, 1921. Serial No. 495,093.

*To all whom it may concern:*

Be it known that I, CHRISTOPH METTLER, Sr., a citizen of the United States, residing at Menno, in the county of Hutchinson and State of South Dakota, have invented certain new and useful Improvements in Grain Cleaners; and I do hereby declare the following to be a full, clear, and exact description of the invention, such as will enable others skilled in the art to which it appertains to make and use the same.

The present invention relates to cleaning devices and has reference more particularly to devices for cleaning, cooling and drying grains by air blasts.

The object of my invention is to produce a device by which various grains may be cleaned, cooled, dried and otherwise improved, which is simple in construction, easy to make and carries no mechanical parts to get out of order or require lubrication.

With this and other objects in view my invention consists in certain novel features of construction, arrangement and combination of parts as will be hereinafter set forth and pointed out in the claims, reference being had to the drawing in which:

Figure 1:
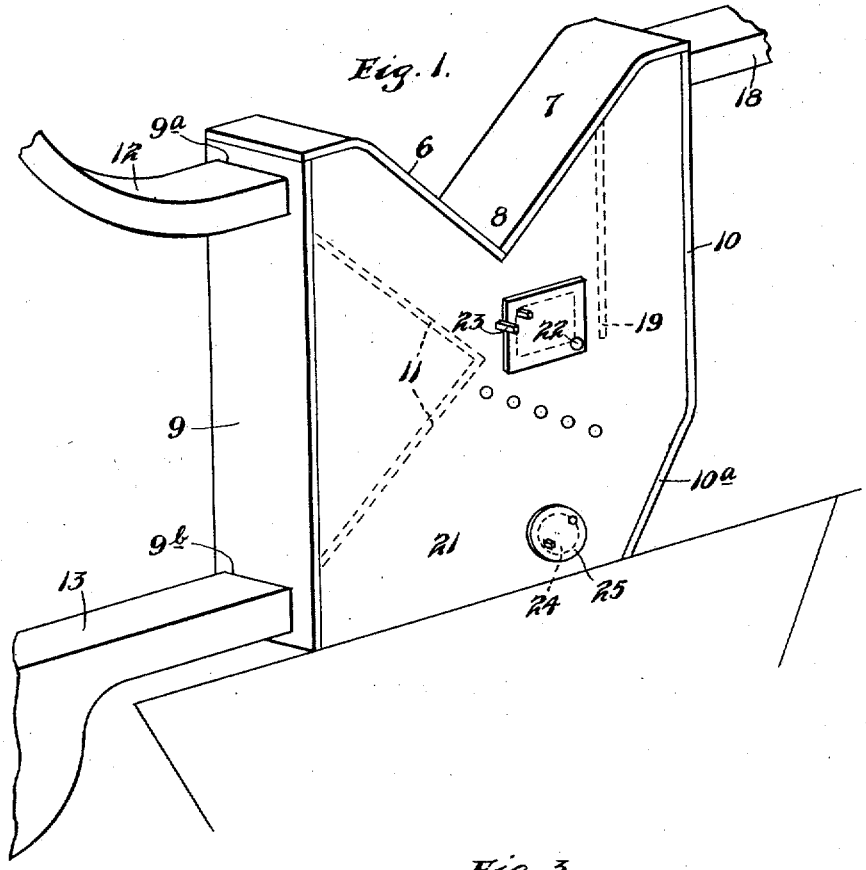
Fig. 1 is a perspective view showing the cleaner as installed.
Figure 3:
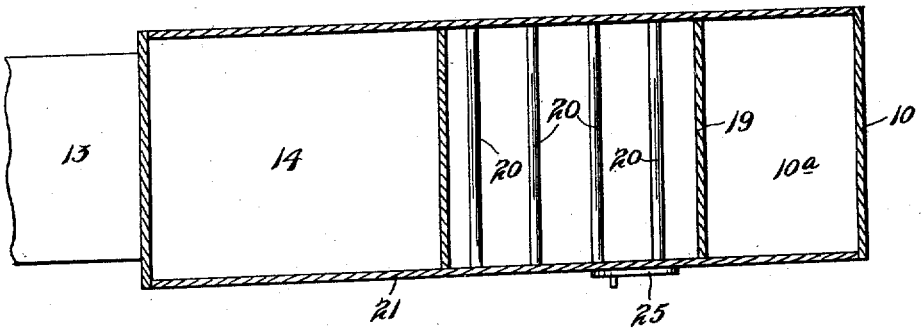
Fig. 3 is a horizontal longitudinal section taken on line 3—3 of Fig. 2.

As a practical embodiment of my invention I utilize a casing which is a box-like structure introduced between supply and storage elements, and may be of any suitable material.

The casing includes a top and bottom front and rear walls and end walls, the casing being of considerably greater extent from end to end than from front to rear.

The top includes two sections 6 and 7 which extend from the upper corners of the ends a short distance horizontally and then obliquely converging meeting in an angle 8; it will thus be seen that top wall projects downwardly into the casing.

The end walls are designated by 9 and 10, the wall 9 having openings $9^a$ and $9^b$ at its upper and lower ends respectively.

11 represents oppositely slanting partitions secured to the inner surface of end wall 9 and the same width as the casing thus filling the space between the front and rear walls.

The upper partition 11 begins at the lower end of the opening $9^a$ and extends into the casing approximately parallel with the section 6 of the top thus forming a downwardly inclined chute.

The lower partition 11 begins a short distance above the opening $9^b$ which is of somewhat less area than the opening $9^a$, and extending upwardly within the casing at an angle meets the upper one of the partitions in a point at approximately the vertical center of the complete device.

To the opening $9^a$ is applied a tubing 12 through which grain is delivered to the cleaner, and at the bottom of the same side to the opening $9^b$ is applied the tubular spout 13 through which blasts of air are fed into the casing.

The lower end of the casing is partially closed by a bottom section 14 which extends about one half way across the lower end leaving a space or opening 15 through which the cleaned grain falls into a bin or other suitable receptacle or provision made for such. The bottom of the casing is fitted in an opening 16 in a floor or platform 17.

Figure 2:
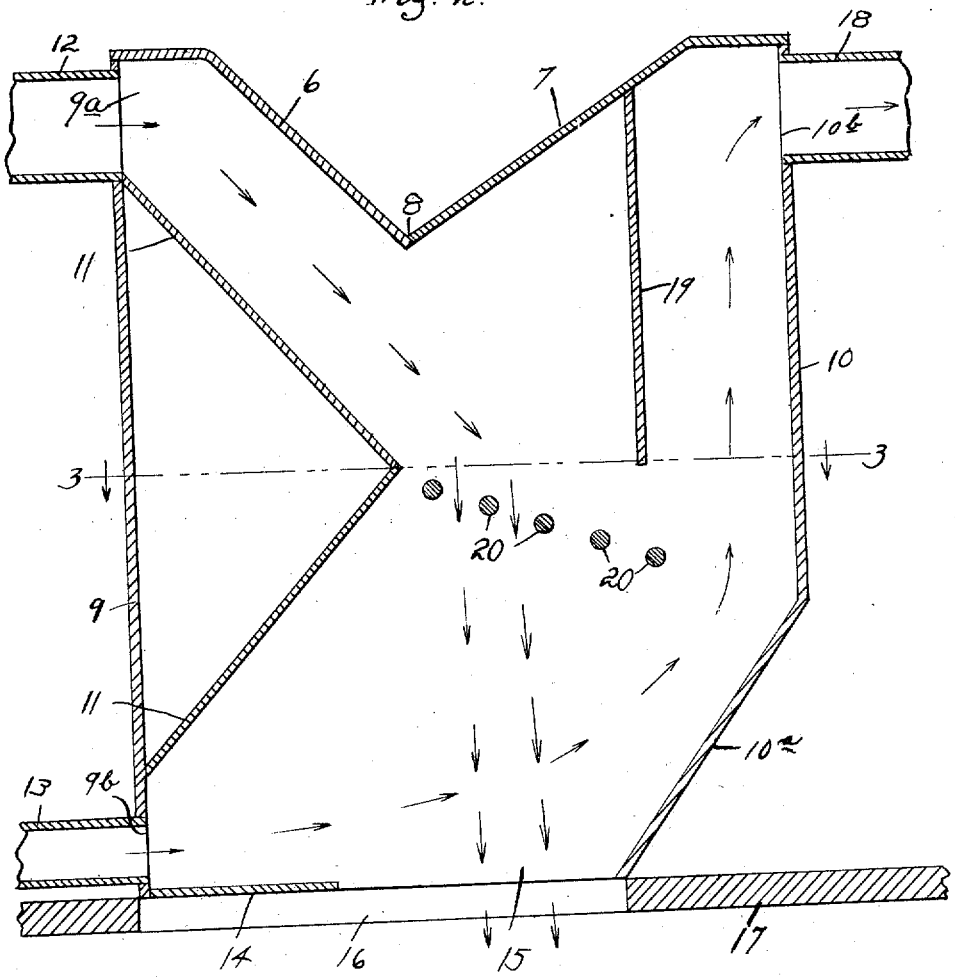
Fig. 2 is a vertical longitudinal section enlarged.

The end wall 10 bends inwardly and downwardly as shown in Fig. 2, presenting an inclined wall $10^a$ which acts to deflect the entering air blast upwardly that it may discharge through the opening $10^b$ in wall 10, and the discharge spout or tube 18.

Depending from the member 7 of the top is a baffle board 19 which fills the space between the front and rear walls and extends downwardly to a point in substantially the horizontal plane of the meeting points of partitions 11. This baffle, it will be noted, is in advance of the incline entrance chute and intervenes between the same and the discharge outlet $10^b$.

The reference characters 20 indicate round rods extending from front to rear of the casing within the same and they are disposed in a slanting series in a plane which is substantially a continuation of the lower wall or floor of the grain inlet chute; the distance between the respective rods of this series is such as to generally let the grains pass freely yet close enough to offer some obstruction and cause the grains to be whirled or tumbled as they drop toward the opening in the bottom.

In the front wall 21 of the casing is provided an opening which is controlled by a pivoted door 22 which is held in its closed position by a keeper 23. This opening may be used to clean out the casing should straw or refuse become caught or clogged in the inclined chute.

At the lower end of the casing the front wall is also provided with a hand-hole 24 covered by a gate valve or cover 25 pivotally secured to the front wall; through this hand-hole the lower end of the casing can be relieved should it become clogged.

It is thought that the operation of the device will be obvious it being understood that the grain enters the casing at 9ª and at the same time and continuously a blast of air is delivered into the casing and through the current of the entering grain; the entering grain is carried down the inclined chute by its weight and force of gravity, and if any should enter with sufficient force to go across the casing it will strike the baffle 19 and fall toward the round rods 20 disposed in a slanting or oblique series.

The grain being heavier than the impurities with which it may be mixed such as smut, chaff, etc., falls through the opening 15 in bottom of casing after having been tumbled on rods 20 thereby loosening and knocking off any adhering foreign substances and also cleaning to some extent.

The entering air blast coming in through tube or spout 13 blows the light foreign substances over toward the inclined wall 10ª which deflects the blast upwardly as indicated by the arrows in Fig. 2 carrying the dirt, etc., and discharging through spout 18.

It will be apparent that the rods 20, in addition to acting as dirt loosening and cleaning members, will also act to distribute the grain and scatter the same by the tumbling action above mentioned so that the same is delivered to the air blast in an efficient manner. The grain being thus scattered or distributed, the light particles are more easily caught and carried off by the current of air.

What is claimed is:

1. A grain cleaner having in combination a substantially closed imperforate casing, a grain inlet means adjacent one upper corner thereof, an air blast inlet means adjacent the lower corner thereof on the same side as the grain inlet means, means for directing the grain downwardly toward the center of the casing terminating at an intermediate point therein, a grain cleaning and distributing device disposed in the path of the grain adjacent the end of but separated from said last mentioned means, an outlet means for the air and impurities carried thereby adjacent the upper corner of the casing opposite the said upper corner, and said casing having a grain outlet opening in its bottom adjacent the side opposite from the air blast inlet means.

2. The structure set forth in claim 1, and a baffle plate substantially parallel with the side of the casing opposite the grain inlet side and extending from the top of the casing downwardly to a point adjacent the said distributing and cleaning means.

3. The structure set forth in claim 1, the said cleaning and distributing means comprising a series of substantially parallel members.

4. The structure set forth in claim 1, the side of the casing opposite the grain inlet sloping inwardly toward the grain outlet opening.

5. A grain cleaner having in combination, a casing having substantially parallel and vertical front and rear end walls, a grain inlet means at one upper corner thereof, an air blast inlet at the corresponding lower corner, means within the casing for causing the currents of grain and air to intersect at an intermediate point in said casing, spaced grain cleaning and distributing means in said casing disposed in the path of the grain intermediate of the top and bottom of the casing, said casing having a discharge opening for grain in the bottom thereof and a discharge opening for the air and impurities carried thereby in the side opposite the grain inlet opening.

6. A grain cleaner having in combination a casing having substantially parallel sides, a grain inlet means at one side and adjacent the top thereof, V-shaped projections extending into said casng from said side and the top forming air and grain directing means, an air blast inlet means at the said side of the casing adjacent the bottom thereof, an air outlet means at the other side of said casing adjacent the top thereof, and said casing having a grain outlet opening in the bottom thereof adjacent said latter side.

7. A grain cleaner having in combination a casing having a grain inlet means adjacent one upper corner thereof, an air blast inlet means adjacent the lower corner thereof on the same side, partitions extending from said side into said casing and intersecting at an intermediate point thereof, spaced grain cleaning and distributng means disposed in the path of the grain adjacent said point of intersection of the said partitions, an outlet means for the air and impurities carried thereby adjacent the upper corner of the casing opposite the said upper corner, and said casing having a grain outlet opening in the bottom thereof.

8. The structure set forth in claim 6, and a baffle means extending downwardly from the top of said casing in front of the air outlet means.

9. A grain cleaner having in combination a casing having substantially parallel sides, a grain inlet means adjacent one upper corner thereof, an air blast inlet means adjacent the lower corner on the same side, members having inwardly converging sides projecting into said casing from said side and the top thereof and forming grain and air directing means, a grain distributing means in said casing adjacent the one of said members projecting from the side of the casing, an outlet means for the air and impurities carried thereby adjacent the top of the casing at the opposite side thereof and said casing having a grain discharge opening in its bottom.

10. A grain cleaner comprising a casing having top and bottom, front and rear, and end walls, the top wall comprising a pair of sections converging downwardly forming an entrant angle, one side wall also having an entrant angle forming with the top section an inclined grain entrance chute, the said side wall having below the entrant portion an air blast entrance, a series of transverse bars disposed in an inclined plane beyond the lower end of the grain entrance chute, a baffle plate depending from the top wall beyond the entrant angle and projecting toward said bars, the bottom of the casing provided with a discharge aperture for the cleaned grain, the discharge side wall having its lower end inclined inwardly to said grain discharge aperture, the upper end of said wall provided with a discharge for mixed air and impurities.

11. In a device of the character and for the purposes specified, the combination with a casing having spaced apart front and rear walls, of a grain entrance and air blast inlet in one end wall, a downwardly inclined chute leading inwardly from the grain entrance, an inclined series of rounded transverse bars continuing beyond the lower end of said chute and at approximately the same inclination, a baffle plate depending vertically from the top of the casing between said transverse bars and a discharge aperture at the upper corner of the other end wall of the casing and projecting toward said bars, the lower portion of said last named end wall inclined downwardly and inwardly to form a deflecting surface whereby mixed air and impurities are directed upwardly to the discharge aperture, and means carried by front wall to permit cleaning both above and below the inclined series of transverse rods.

In testimony whereof I affix my signature.

CHRISTOPH METTLER, Sr.